(12) United States Patent
Eaton et al.

(10) Patent No.: US 9,405,165 B2
(45) Date of Patent: Aug. 2, 2016

(54) CONTROLLER CONFIGURED FOR AN ELECTRO-OPTIC DEVICE AND METHOD THEREOF

(71) Applicant: Gentex Corporation, Zeeland, MI (US)

(72) Inventors: David L. Eaton, Holland, MI (US); Thomas F. Guarr, Holland, MI (US); Kevin L. Ash, Grand Rapids, MI (US); David A. Theiste, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 133 days.

(21) Appl. No.: 13/804,561

(22) Filed: Mar. 14, 2013

(65) Prior Publication Data

US 2013/0258440 A1      Oct. 3, 2013

Related U.S. Application Data

(60) Provisional application No. 61/618,036, filed on Mar. 30, 2012.

(51) Int. Cl.
*G02F 1/153*      (2006.01)
*G02F 1/163*      (2006.01)

(52) U.S. Cl.
CPC ..................... *G02F 1/163* (2013.01)

(58) Field of Classification Search
CPC ....................................................... G02F 1/163
USPC .................................. 359/275, 265
See application file for complete search history.

(56) References Cited

U.S. PATENT DOCUMENTS 3,521,941 A    7/1970  Deb et al.
4,640,583 A    2/1987  Hoshikawa et al.
(Continued)

FOREIGN PATENT DOCUMENTS

JP    08110533    4/1996
JP    09132038    5/1997
(Continued)

OTHER PUBLICATIONS

Patent Cooperation Treaty, International Searching Authority, International Search Report, Written Opinion of the International Searching Authority and Notification of Transmittal, Jul. 18, 2013, 7 Pages.
(Continued)

*Primary Examiner* — James Jones
(74) *Attorney, Agent, or Firm* — Price Heneveld LLP; Scott P. Ryan (57) ABSTRACT

A controller system configured to control an electrochromic device and method thereof are provided, wherein the controller system includes an electrochromic device having a first substantially transparent substrate, a second substantially transparent substrate approximately parallel to the first substantially transparent substrate such that a chamber is defined by the first and second substantially transparent substrates, and an electrochromic medium between the first and second substantially transparent substrates, and a controller in communication with the electrochromic device, wherein the controller is configured to monitor electrical power supplied to the electrochromic device and adjust the electrical power supplied to the electrochromic device to maintain the electrochromic device in an approximately minimum transmission state.

20 Claims, 6 Drawing Sheets

(56) References Cited

U.S. PATENT DOCUMENTS

| | | | |
|---|---|---|---|
| 4,646,158 A | 2/1987 | Ohno et al. | |
| 4,702,566 A | 10/1987 | Tukude | |
| 4,893,908 A | 1/1990 | Wolf et al. | |
| 4,917,477 A | 4/1990 | Bechtel et al. | |
| 5,004,961 A | 4/1991 | Berner et al. | |
| 5,066,111 A | 11/1991 | Singleton et al. | |
| 5,092,939 A | 3/1992 | Nath et al. | |
| 5,124,832 A | 6/1992 | Greenberg et al. | |
| 5,136,419 A | 8/1992 | Shabrang | |
| 5,161,048 A | 11/1992 | Rukavina | |
| 5,202,787 A | 4/1993 | Byker et al. | |
| 5,228,925 A | 7/1993 | Nath et al. | |
| 5,384,578 A | 1/1995 | Lynam et al. | |
| 5,384,653 A | 1/1995 | Benson et al. | |
| 5,612,847 A | 3/1997 | Malecke et al. | |
| 5,654,736 A | 8/1997 | Green et al. | |
| 5,657,149 A | 8/1997 | Buffat et al. | |
| 5,724,176 A | 3/1998 | Nishikitani et al. | |
| 5,724,187 A | 3/1998 | Varaprasad et al. | |
| 5,725,809 A | 3/1998 | Varaprasad et al. | |
| 5,805,330 A | 9/1998 | Byker et al. | |
| 5,838,483 A | 11/1998 | Teowee et al. | |
| 5,889,608 A | 3/1999 | Buffat et al. | |
| 5,995,273 A | 11/1999 | Chandrasekhar | |
| 6,020,989 A | 2/2000 | Watanabe | |
| 6,045,724 A | 4/2000 | Varaprasad et al. | |
| 6,055,089 A | 4/2000 | Schulz et al. | |
| 6,056,410 A * | 5/2000 | Hoekstra | B60R 1/088 359/267 |
| 6,084,702 A | 7/2000 | Byker et al. | |
| 6,166,496 A | 12/2000 | Lys et al. | |
| 6,207,083 B1 | 3/2001 | Varaprasad et al. | |
| 6,210,008 B1 | 4/2001 | Hoekstra et al. | |
| 6,245,262 B1 | 6/2001 | Varaprasad et al. | |
| 6,254,003 B1 | 7/2001 | Pettinelli et al. | |
| 6,293,843 B1 | 9/2001 | Toya et al. | |
| 6,302,986 B1 | 10/2001 | Toya et al. | |
| 6,406,152 B1 | 6/2002 | Hoekstra et al. | |
| 6,407,847 B1 | 6/2002 | Poll et al. | |
| 6,425,792 B1 | 7/2002 | Toya et al. | |
| 6,471,360 B2 | 10/2002 | Rukavina et al. | |
| 6,474,820 B1 | 11/2002 | Hoekstra et al. | |
| 6,567,708 B1 | 5/2003 | Bechtel et al. | |
| 6,621,616 B1 | 9/2003 | Bauer et al. | |
| 6,770,068 B2 | 8/2004 | Ruiz et al. | |
| 6,829,511 B2 | 12/2004 | Bechtel et al. | |
| 6,853,472 B2 | 2/2005 | Warner et al. | |
| 6,906,632 B2 | 6/2005 | DeLine et al. | |
| 6,924,919 B2 | 8/2005 | Hunia et al. | |
| 6,961,168 B2 | 11/2005 | Agrawal et al. | |
| 6,963,437 B2 | 11/2005 | Bauer et al. | |
| 7,085,609 B2 | 8/2006 | Bechtel et al. | |
| 7,130,101 B2 | 10/2006 | Rukavina et al. | |
| 7,256,924 B2 | 8/2007 | Guarr et al. | |
| 7,274,501 B2 | 9/2007 | McCabe et al. | |
| 7,397,595 B2 | 7/2008 | Kojima | |
| 7,450,291 B2 | 11/2008 | Guarr et al. | |
| 7,471,438 B2 | 12/2008 | McCabe et al. | |
| 7,511,872 B2 | 3/2009 | Tonar et al. | |
| 7,542,809 B2 | 6/2009 | Bechtel et al. | |
| 7,822,490 B2 | 10/2010 | Bechtel et al. | |
| 8,219,217 B2 | 7/2012 | Bechtel et al. | |
| 2004/0160660 A1 | 8/2004 | Malvino | |
| 2005/0063036 A1 | 3/2005 | Bechtel et al. | |
| 2005/0156753 A1 | 7/2005 | DeLine et al. | |
| 2005/0200935 A1 | 9/2005 | Liu et al. | |
| 2006/0018000 A1 | 1/2006 | Greer | |
| 2010/0172009 A1 | 7/2010 | Matthews | |
| 2010/0235657 A1 | 9/2010 | Cho | |
| 2012/0062975 A1 | 3/2012 | Mehtani et al. | |
| 2012/0218618 A1 | 8/2012 | Tonar et al. | |
| 2012/0293855 A1 * | 11/2012 | Shrivastava et al. | 359/275 |
| 2014/0104667 A1 * | 4/2014 | Greer et al. | 359/275 |

FOREIGN PATENT DOCUMENTS

| | | |
|---|---|---|
| JP | 11029065 | 2/1999 |
| WO | WO 98/57228 | 12/1998 |
| WO | WO2004/098953 | 11/2004 |

OTHER PUBLICATIONS

R Sullivan et al., "Effect of Switching Control Strategies on the Energy Performance of Electrochromic Windows," SPIE, vol. 2255, pp. 443-455 (Feb. 1994).

A.W. Czanderna et al., "Durability Issues and Service Lifetime Prediction of Electrochromic Windows for Buildings Applications," Solar Energy Materials & Solar Cells, 56 (1999), pp. 419-436.

* cited by examiner

CONTROLLER CONFIGURED FOR AN ELECTRO-OPTIC DEVICE AND METHOD THEREOF

CROSS-REFERENCE TO RELATED APPLICATIONS

This application claims the priority of U.S. Provisional Patent Application No. 61/618,036 entitled "CONTROLLER CONFIGURED FOR AN ELECTROCHROMIC DEVICE AND METHOD THEREOF," filed on Mar. 30, 2012, by David L. Eaton et al., the entire disclosure of which is hereby incorporated herein by reference.

FIELD OF THE INVENTION

The present invention generally relates to a controller, and more particularly, to a controller configured for an electro-optic device and method thereof.

BACKGROUND OF THE INVENTION

Generally, electro-optic windows have a controller for activating the window to be in a clear state, a dim state, or an intermediate state.

SUMMARY OF THE INVENTION

According to one aspect of the present invention, a controller system configured to control an electrochromic device, the controller system including an electrochromic device having a first substantially transparent substrate, a second substantially transparent substrate approximately parallel to the first substantially transparent substrate such that a chamber is defined by the first and second substantially transparent substrates, and an electrochromic medium between the first and second substantially transparent substrates, and a controller in communication with the electrochromic device, wherein the controller is configured to monitor electrical power supplied to the electrochromic device and adjust the electrical power supplied, such that approximately a minimum potential is applied to the electrochromic device to maintain the electrochromic device in an approximately minimum transmission state.

According to another aspect of the present invention, a method for maintaining an electro-optic device at a substantially dark state, the method comprising the steps of supplying electrical power to the electro-optic device, and adjusting the supplied electrical power to maintain the electro-optic device in an approximately minimum transmission state independent of a measurement of temperature of the electro-optic device.

According to yet another aspect of the present invention, a non-transitory computer readable medium having stored thereon software instructions that, when executed by a processor, cause the processor to generate control signals to control an electro-optic device, by executing the steps comprising supplying electrical power to the electro-optic device, and adjusting the supplied electrical power to maintain the electro-optic device in an approximately minimum transmission state independent of a measurement of temperature of the electro-optic device.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

The present illustrated embodiments reside primarily in combinations of method steps and apparatus components related to a controller configured for an electro-optic device and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
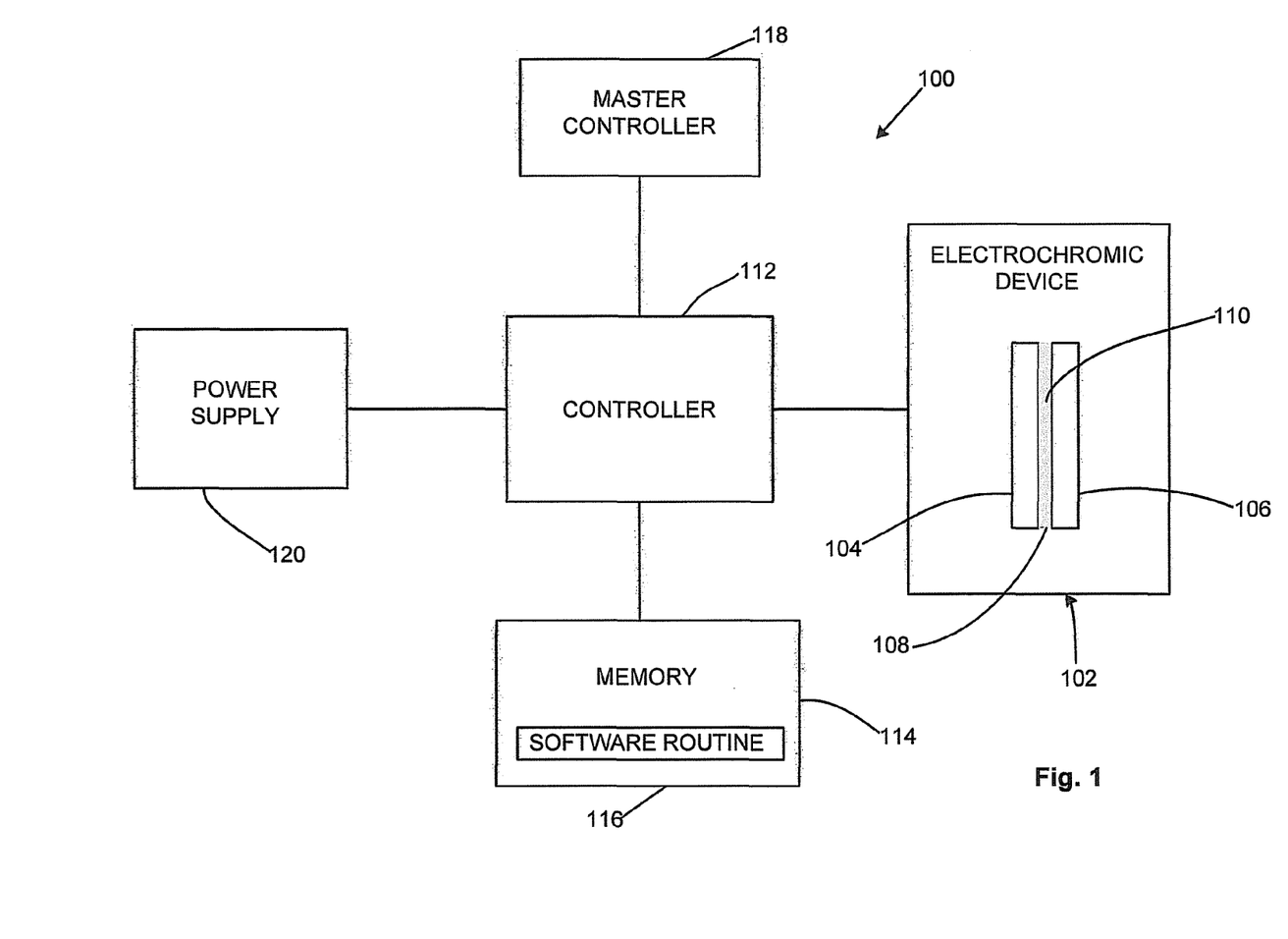
FIG. 1 is a block diagram of a controller system, in accordance with one embodiment of the present invention.

In reference to FIG. 1, a controller system is generally shown at reference identifier 100, and is configured to control an electro-optic device (e.g., electrochromic device) generally indicated at reference identifier 102. The electro-optic device 102 includes a first substantially transparent substrate 104, a second substantially transparent substrate 106 that is approximately parallel to the first substantially transparent substrate 104, such that a chamber 108 is defined by the first and second substantially transparent substrates 104, 106, and an electrochromic medium 110 is between said first and second substantially transparent substrates 104, 106. The controller system 100 also includes a controller 112 in communication with the electrochromic device 102, wherein the controller 112 is configured to monitor electrical power supplied to the electrochromic device 102 and adjust the electrical power supplied to the electro-optic device 102 to maintain the electro-optic device 102 in an approximately minimum transmission state, as described in greater detail herein.

According to one embodiment, the controller 112 monitors current through the electro-optic device 102 and a voltage across the electro-optic device 102 during the use of the electro-optic device 102. The controller 112 can include or be in communication with a memory device 114 that includes one or more executable software routines 116, which can be executed by the controller 112 to calculate quantities, such as, but not limited to, a first and second derivative of the current. By finding a maxima and minima of these derivatives, the point at which the electro-optic device 102 has reached approximately a minimum transmission can be determined Thus, the point where additional voltage will not result in further current flow can be determined. This point can be determined and obtained by the controller system 100 by supplying appropriate voltage (e.g., the voltage found from the behavior of the derivatives). Therefore, the desired operating point, which varies as a function of temperature, can be determined and obtained by the controller system 100, without the use of a temperature sensor to measure the temperature.

The approximately minimum transmission point can be represented by the same qualitative behavior of derivatives, though the values may vary. Thus, the controller system 100 functions without measurement or explicit derivation of temperature, but can act as a proxy for temperature, and could enable calculation of estimated temperature if calibrated.

With continued reference to FIG. 1, the controller system 100 can also include a master controller 118 in communication with the controller 112, and a power supply 120 in communication with the controller 112. It should be appreciated by those skilled in the art that a plurality of controllers 112 and/or a plurality of electro-optic devices 102 can be included in the controller system 100.

According to one embodiment, the electro-optic device 102 is an electrochromic window. However, it should be appreciated by one having ordinary skill in the art that the electro-optic device 102 and be any suitable electro-optic device, such as, but not limited to, and electrochromic mirror. References to the electro-optic device 102 being an electrochromic device or for purposes of explanation and not limitation.

The clearing of the electrochromic device 102 is a matter of having the color species return to their uncolored form, such that the electrons are transferred to and from colored species to yield their lower energy, uncolored counterparts. This can occur by diffusion alone, but the process is typically slow in electrochromic devices of any size. Diffusion in addition to shorting of the electrochromic device reduces the diffusion time by allowing the process to occur both by diffusion and annihilation (e.g., actual meeting of colored species and consequent electron transfer), which happens in an open circuit part, as well as allowing the external circuit to shuttle electrons to and from the opposite polarity electrodes, where there is typically a concentration of the important species. This is faster, and exploits the existing concentration gradients rather than working against them; however, this can be impractically slow.

The electrochromic device 102 can be symmetrical, in that it can color with either electrode as the anode or cathode. By applying a potential to a colored part, opposite the polarity used to color it, species are formed at the electrodes that annihilate the existing colored species. This increases the speed of clearing; however, a critical point for annihilation can be passed, wherein the electrochromic device 102 starts coloring again "from the other direction." By applying a series of reverse pulses, followed by shorting periods, the controller system 100 can be empirically tuned to yield an enhanced clearing process without reverse coloring the electrochromic device 102, in essentially an "open loop."

One factor of consideration is that the kinetics of such control is a function of temperature of the electrochromic device 102. Additionally, each electrochromic device 102 can have one or more unique operating characteristics, such that a "one size fits all" algorithm will likely fail to clear the electrochromic device 102 in an efficient manner without reverse coloring.

Figure 5:
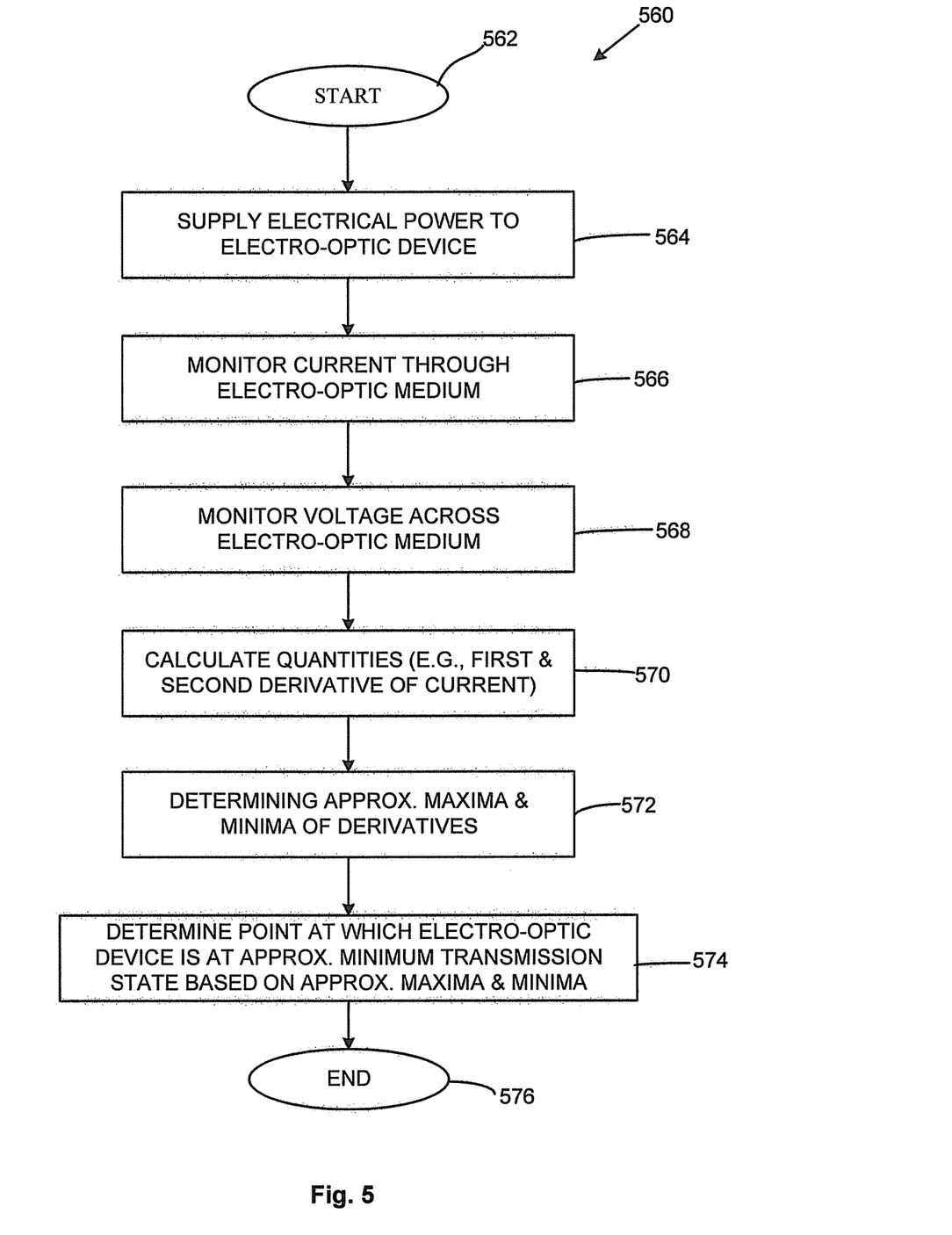
FIG. 5 is a flow chart illustrating a method for maintaining an electro-optic device at a substantially dark state, in accordance with one embodiment of the present invention.

In regards to FIGS. 1 and 5, a method for maintaining an electro-optic device at a substantially dark state is generally shown in FIG. 5 at reference identifier 560. The method 560 can start at step 562 (e.g., when the electro-optic device is 102 is activated to be in a dark state, the controller system 100 is powered on, etc.), and proceed to step 564, wherein electrical power is supplied to an electro-optic device. At step 566, a current through an electro-optic medium is monitored, and at step 568, a voltage potential across the electro-optic medium is monitored.

The method 560 can then proceed to step 570, wherein quantities are calculated. Examples of the calculated quantities are, but not limited to, a first derivative of the current and a second derivative of the current. At step 572 approximate maxima and minima of derivatives are determined, and at step 574 a point at which the electro-optic device is at approximately a minimum transmission state is determined based on the approximate maxima and minima. The method 560 can then end at step 576 (e.g., when the electro-optic device is 102 is activated to be in a clear or intermediate state, the controller system 100 is powered off, etc.).

According to one embodiment, the controller system 100 can be configured for reverse potential monitoring and reverse potential control. When a colored electrochromic device 102 is operating as an open circuit, the potential that the non-equilibrium state of the electrochromic device 102 produces can be monitored. The magnitude of an open circuit voltage (OCV) is used to determine the counter-potential applied in order to clear the electrochromic device 102, since confining the potential to this, or to a calculated related potential, can prevent reverse coloring.

Figure 2:
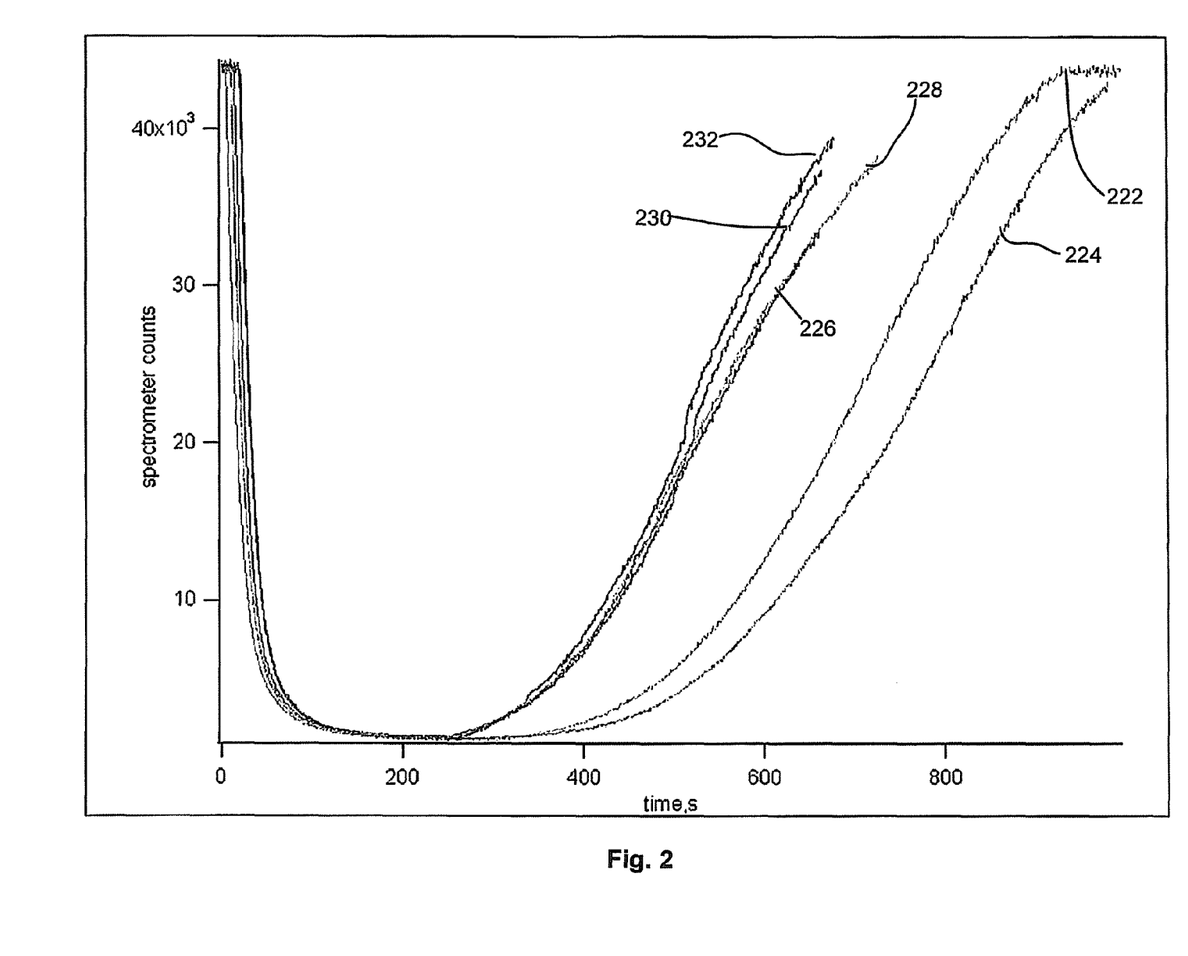
FIG. 2 is a chart illustrating different durations between reverse a potential and shorting, in accordance with embodiments of the present invention.

As illustrated in FIG. 2, a time that the potential is applied is limited, or the clearing process will be slowed, while still preventing reverse coloring. Line 222 represents shorted with no reverse potential, line 224 represents reverse potential and then substantially immediate shorting for an approximately 5 second duration, line 226 represents reverse potential for approximately 5 seconds before shorting for an approximately 5 second duration, line 228 represents reverse potential for approximately 10 seconds before shorting for an approximately 5 second duration, line 230 represents reverse potential for approximately 15 seconds before shorting for an approximately 5 second duration, and line 232 represents reverse potential for approximately 20 seconds before shorting for an approximately 5 second duration.

Figure 3:
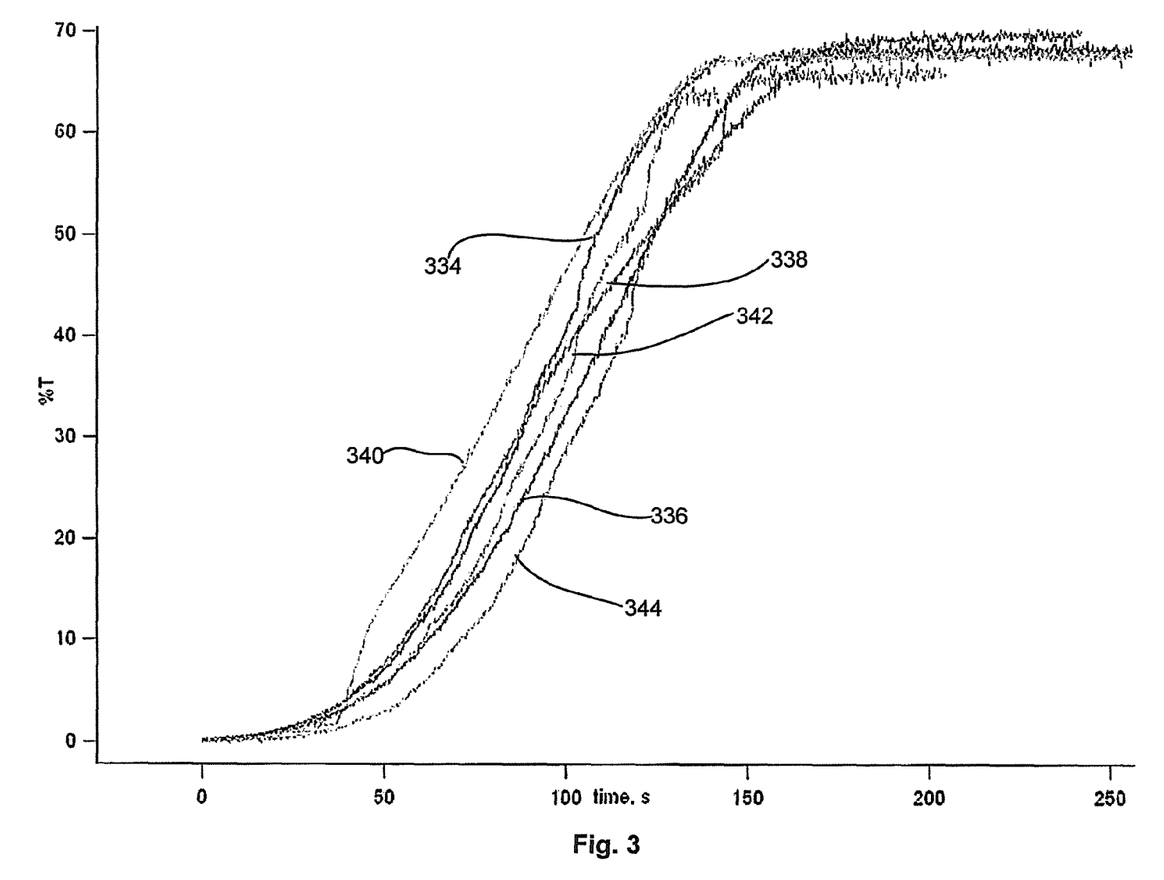
FIG. 3 is a chart illustrating different durations of reverse voltage pulses and shorting, in accordance with embodiments of the present invention.

In regards to FIG. 3, this graph illustrates time measuring in % T and varying the shorting time. Line 334 represents an approximately 10 second reverse voltage pulse duration and an approximately 5 second shorting duration, line 336 represents an approximately 1 second reverse voltage pulse duration and an approximately 5 second shorting duration, line 338 represents an approximately 10 second reverse voltage pulse duration and an approximately 2 second shorting duration, line 340 represents another variation of reverse voltage pulse duration and shorting duration, line 342 represents an approximately 10 second reverse voltage pulse duration and an approximately 10 second shorting duration, and line 344 represents an approximately 15 second reverse voltage pulse duration and an approximately 10 second shorting duration.

According to one embodiment, the controller system 100 can be configured for current monitoring and reverse potential control. When the controller system 100 is configured to monitor current in a circuit associated with the electrochromic device 102, the controller 112 can be configured to apply a reversing potential to the electrochromic device 102 while reducing the current flowing in the reverse direction which would cause reverse coloring. By way of explanation and not limitation, magnitude, polarity, rate of change, or the like tests can be applied to modulate the reversing voltage to reduce the reverse coloring. Additionally, there is an automatic correction for temperature change, as the increase in kinetics is apparent based upon a faster rise in current. Thus, this is a closed-loop method, that when tuned, can enhance speed of clearing. The connection between the clearing and the current is such that electrochromic devices 102 of various sizes can work without a specific, new empirical algorithm having to be developed.

Figure 4:
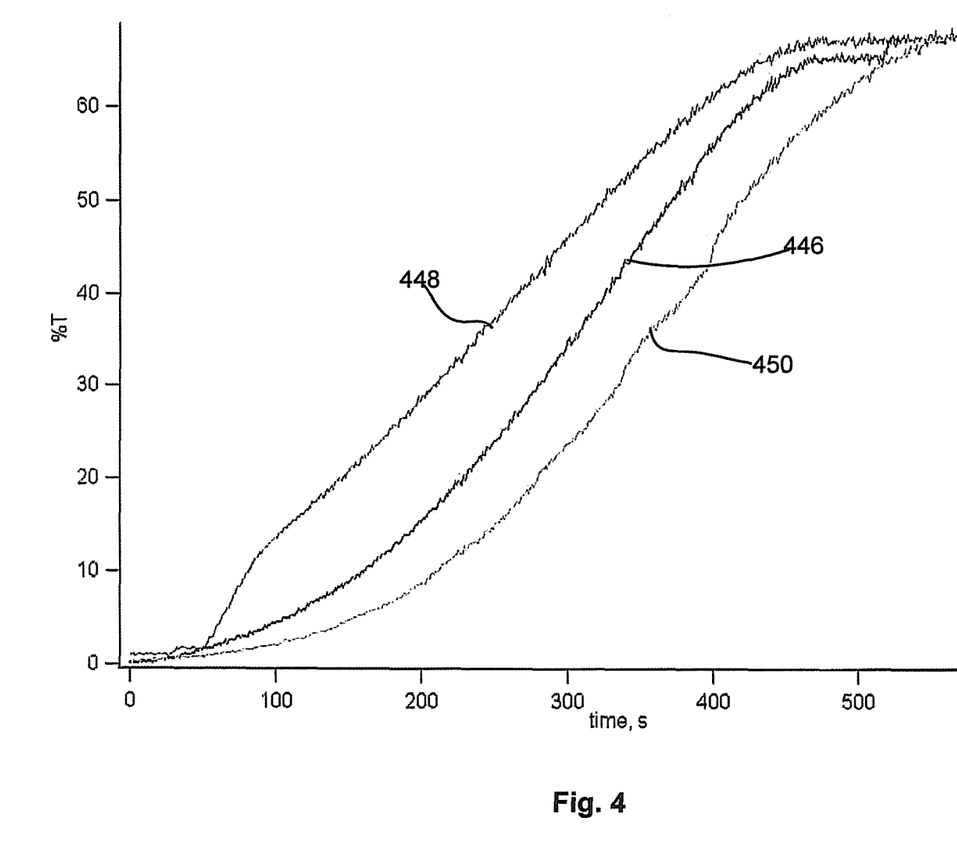
FIG. 4 is a chart illustrating different durations of reverse current and shorting, in accordance with embodiments of the present invention.

In regards to FIG. 4, the reverse current can be monitored and the applied potential can be adjusted that keep the current magnitude substantially maximized, and reduce current flow that causes reverse coloring. Line 446 and line 448 represent different variations, and line 450 represents the controller system 100 having an approximately 10 second reverse current duration and an approximately 5 second shorting duration.

Figure 6:
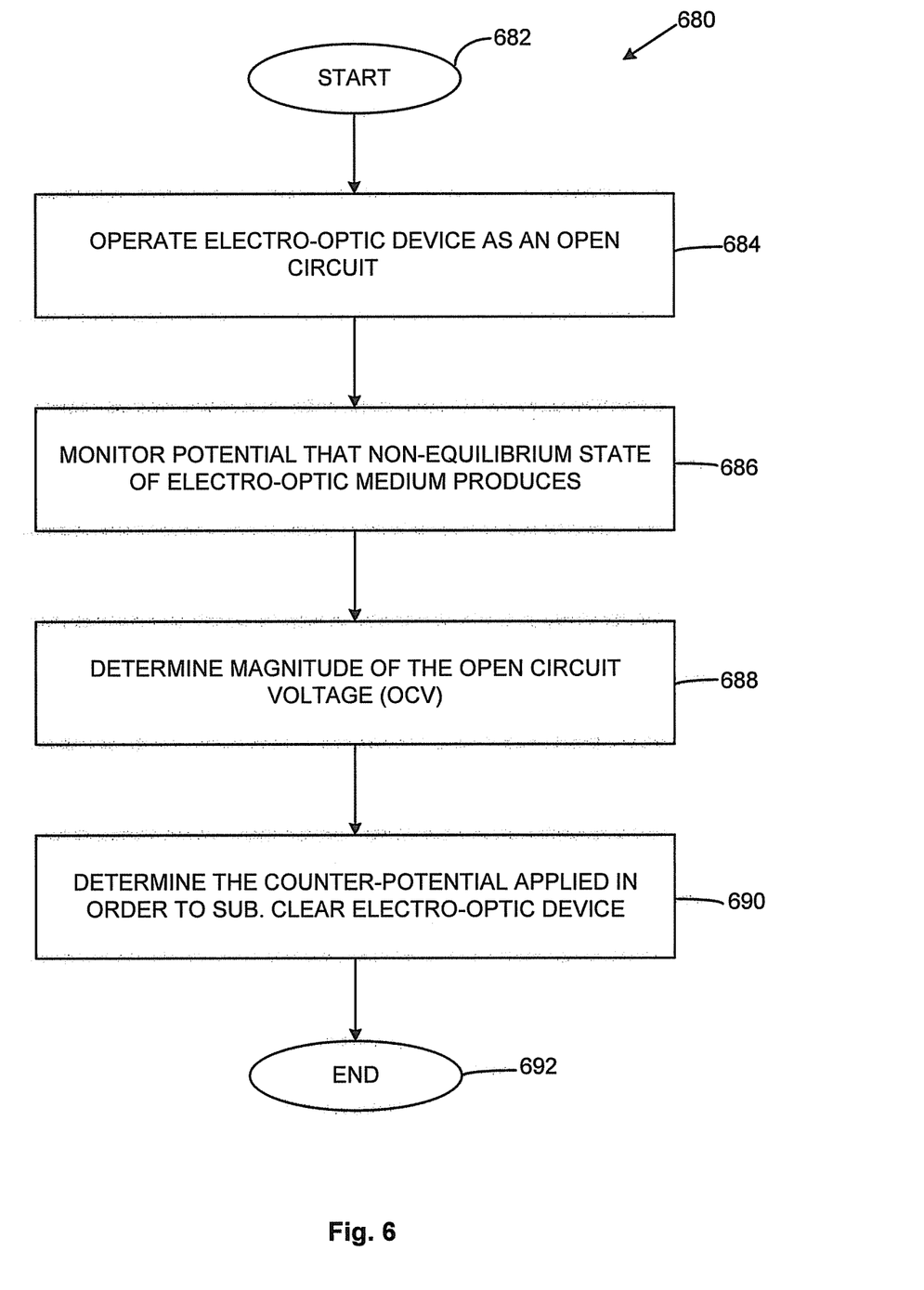
FIG. 6 is a flow chart illustrating a method for clearing an electro-optic device, in accordance with one embodiment of the present invention.

With respect to FIGS. 2-4 and 6, a method for clearing an electro-optic device is generally shown in FIG. 6 at reference identifier 680. The method 680 can start at step 682 (e.g., when the electro-optic device is 102 is activated to be in a dark state, the controller system 100 is powered on, etc.), and proceed to step 684, wherein an electro-optic device is operated as an open circuit. At step 686, a potential that a non-equilibrium state of an electro-optic medium produces is monitored, and at 688, a magnitude of the OCV is determined At step 690, the counter-potential applied in order to substantially clear the electro-optic device is determined. The method 680 can then end at step 692 (e.g., when the electro-optic device is 102 is activated to be in a clear or intermediate state, the controller system 100 is powered off, etc.).

According to one embodiment, the controller system 100 can be configured to increase a transmittance of the electro-optic device devoid of any periodic reduction in transmission being less than about 0.7% of the current transmission or less than about 0.5% of the current transmission.

The controller system 100 can be configured to increase a transmittance of the electro-optic device, such that there is approximately no reductions in transmission during clearing. For purposes of explanation and not limitation, there can be less about two periodic reductions (e.g., pulses) in transmission per minute.

According to one embodiment, a non-transitory computer readable medium having stored thereon software instructions that, when executed by a processor, cause the processor to generate control signals to control an electro-optic device by executing the steps described herein.

It will be appreciated that embodiments of the invention described herein may be comprised of one or more conventional processors and unique stored program instructions that control one or more processors to implement, in conjunction with certain non-processor circuits, some, most, or all of the functions of a controller configured for an electrochromic device and method thereof, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For purposes of the present disclosure, and as will be explained in greater detail herein below, the electrochromic medium preferably comprises at least one solvent, at least one anodic material, and at least one cathodic material.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

The electrochromic medium is preferably chosen from one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Specific examples of anodic materials which are suitable for use in accordance with the present invention, include, but are not limited to, di-tert-butyl-diethylferrocene, 5,10-dimethyl-5,10-dihydrophenazine (DMP), 3,7,10-trimethylphenothiazine, 2,3,7,8-tetramethoxythianthrene, 10-methylphenothiazine, tetramethylphenazine (TMP; see U.S. Pat. No. 6,242,602 B1 for synthesis, which is hereby incorporated herein by reference in its entirety), and bis(butyltriethylammonium)-para-methoxytriphenodithiazine (TPDT; see synthesis of 3,10-dimethoxy-7,14-(triethylammoniumbutyl)-triphenodithazinebis(tetrafluoroborate) in U.S. Pat. No. 6,710,906 B2, which is hereby incorporated herein by reference in its entirety). It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use in accordance with the present invention, including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds and Associated Media and Devices," all of which are hereby incorporated herein by reference in their entirety including all references incorporated and/or cited therein.

For illustrative purposes only, the concentration of the anodic material(s) may range from approximately 1 millimolar (mM) to approximately 500 mM, and more preferably from approximately 2 mM to approximately 100 mM.

For purposes of the present invention, cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate (TTBFc+)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other cathodic materials are likewise contemplated for use, including, but by no means limited to, those disclosed in U.S. Pat. No. 4,902,108, U.S. Pat. No. 6,188,505, U.S. Pat. No. 6,710,906 B2, as well as U.S. Pat. No. 7,855,821 B2 entitled "Electrochromic Compounds and Associated Media and Devices," all of which are hereby incorporated herein by reference in their entirety including all references incorporated and/or cited therein. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the cathodic material(s) may range from approximately 1 millimolar (mM) to approximately 500 mM, and more preferably from approximately 2 mM to approximately 100 mM.

For purposes of the present disclosure, the electrochromic medium preferably comprises any one of a number of commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In addition, the electrochromic medium may comprise other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices," which is hereby incorporated herein by reference in its entirety—including all continuing applications/patents claiming priority therefrom. Suitable UV-stabilizers may include: the material 2-ethyl-2-cyano-3, 3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU.

According to one embodiment, a controller system configured to control an electro-optic device, the controller system comprising an electro-optic device comprising: a first substantially transparent substrate a second substantially transparent substrate approximately parallel to the first substantially transparent substrate such that a chamber is defined by the first and second substantially transparent substrates; and an electro-optic medium between the first and second substantially transparent substrates; and a controller in communication with the electro-optic device, wherein the controller is configured to monitor electrical power supplied to the electro-optic device and adjust the electrical power supplied, such that approximately a minimum potential is applied to the electro-optic device to maintain the electro-optic device in an approximately minimum transmission state.

The controller system as described herein, wherein the controller is further configured to maintain the electro-optic device in the approximately minimum transmission state independent of a measurement of temperature of the electro-optic device.

The controller system as described herein, wherein electrical power needed to maintain the electro-optic device at the approximate minimum transmission state varies based upon temperature of the electro-optic device, such that the controller is configured to electrical power to be supplied to the electro-optic device is determined by the controller without receiving an input from a temperature sensor.

The controller system as described herein, wherein the controller is further configured calculate a first derivative and a second derivative of electrical current across the electro-optic device and determine an approximate maxima and minima of the first and second derivatives, such that the electrical power to be supplied to maintain the approximately minimum transmission state can be determined based upon the maxima and minima.

The controller system as described herein, wherein the controller is further configured for reverse potential monitoring and reverse potential control.

The controller system as described herein, wherein the reverse potential monitoring and reverse potential control comprises the electro-optic device operating as an open circuit, such that an open circuit voltage potential that a non-equilibrium state of the electro-optic device produces is monitored.

According to one embodiment, a controller system configured to control an electro-optic device, the controller system comprising an electro-optic device comprising a first substantially transparent substrate, a second substantially transparent substrate approximately parallel to the first substantially transparent substrate such that a chamber is defined by the first and second substantially transparent substrates, and an electro-optic medium between the first and second substantially transparent substrate, and a controller in communication with the electro-optic device, wherein the controller is configured for reverse potential monitoring and reverse potential control, wherein the reverse potential monitoring and reverse potential control comprises the electro-optic device operating as an open circuit, such that an open circuit voltage potential that a non-equilibrium state of the electro-optic device produces is monitored.

The controller system as described herein, wherein the controller is configured to use a magnitude of the open circuit voltage potential to determine a counter-potential that is applied in order to clear the electro-optic device.

The controller system as described herein, wherein the controller is further configured for current monitoring and reverse potential control.

According to one embodiment, a controller system configured to control an electro-optic device, the controller system comprising an electro-optic device comprising a first substantially transparent substrate a second substantially transparent substrate approximately parallel to the first substantially transparent substrate such that a chamber is defined by the first and second substantially transparent substrates, and an electro-optic medium between the first and second substantially transparent substrates, and a controller in communication with the electro-optic device, wherein the controller is configured for reverse potential monitoring and reverse potential control, wherein the controller is further configured for current monitoring and reverse potential control.

The controller system as described herein, wherein the current monitoring and reverse potential comprises applying a reverse potential to the electro-optic device while reducing a current to reverse direction that would otherwise cause reverse coloring.

The controller system as described herein, wherein the controller is further configured to monitor reverse current and dynamically adjust a potential to maintain a substantially maximized current magnitude and reduce current flow that otherwise results in reverse coloring.

The controller system as described herein, wherein the controller is further configured to control the electro-optic device transitions from a substantially clear state to a substantially dark state without substantially pulsing.

The controller system as described herein, wherein the controller is further configured to control the electro-optic device, such that a transmittance of the electro-optic device monitonically increases.

The controller system as described herein, wherein the controller is further configured to increase a transmittance of the electro-optic device devoid of any periodic reduction in transmission being less than about 0.7% of the current transmission or less than about 0.5% of the current transmission.

The controller system as described herein, wherein the controller is further configured to increase a transmittance of the electro-optic device, such that there is approximately no reductions in transmission during clearing. According to one embodiment, there are less about two periodic reductions (e.g., pulses) in transmission per minute.

According to one embodiment, a method for maintaining an electro-optic device at a substantially dark state, the method comprising the steps of supplying electrical power to the electro-optic device, and adjusting the supplied electrical power to maintain the electro-optic device in an approximately minimum transmission state independent of a measurement of temperature of the electro-optic device.

The method as described herein, further comprising the steps of calculating a first derivative of electrical current across the electro-optic device, calculating a second derivative of electrical current across the electro-optic device, and determining an approximate maxima and minima of the first and second derivatives.

According to one embodiment, a method for clearing an electro-optic device, the method comprising the steps of supplying electrical power to the electro-optic device, monitoring a reverse potential, and controlling the reverse potential, wherein the electro-optic device operates as an open circuit, such that an open circuit voltage potential that a non-equilibrium state of the electro-optic device produces is monitored.

The method as described herein, further comprising the step of transitioning the electro-optic device from a substantially clear state to a substantially dark state without substantially pulsing.

The method as described herein, further comprising the step of monitonically increasing a transmittance of the electro-optic device.

The method as described herein, further comprising the step of increasing a transmittance of the electro-optic device devoid of any periodic reduction in transmission being less than about 0.7% of the current transmission or less than about 0.5% of the current transmission.

The method as described herein, further comprising the step of increasing a transmittance of the electro-optic device, such that there is approximately no reductions in transmission during clearing. According to one embodiment, there are less about two periodic reductions (e.g., pulses) in transmission per minute.

The method as described herein, further comprising the step of using a magnitude of the open circuit voltage potential to determine a counter-potential that is applied in order to clear the electro-optic device.

The method as described herein, further comprising the steps of monitoring a reverse current, and dynamically adjusting a potential to maintain a substantially maximized current magnitude and reduce current flow that otherwise results in reverse coloring.

According to one embodiment, a non-transitory computer readable medium having stored thereon software instructions that, when executed by a processor, cause the processor to generate control signals to control an electro-optic device, by executing the steps comprising supplying electrical power to the electro-optic device, and adjusting the supplied electrical power to maintain the electro-optic device in an approximately minimum transmission state independent of a measurement of temperature of the electro-optic device.

The non-transitory computer readable medium as described herein, further executing the steps comprising calculating a first derivative of electrical current across the electro-optic device, calculating a second derivative of electrical current across the electro-optic device, and determining an approximate maxima and minima of the first and second derivatives.

According to one embodiment, a non-transitory computer readable medium having stored thereon software instructions that, when executed by a processor, cause the processor to generate control signals to control an electro-optic device, by executing the steps comprising supplying electrical power to the electro-optic device, monitoring a reverse potential, and controlling the reverse potential, wherein the electro-optic device operates as an open circuit, such that an open circuit voltage potential that a non-equilibrium state of the electro-optic device produces is monitored.

The non-transitory computer readable medium as described herein, further executing the steps comprising transitioning the electro-optic device from a substantially clear state to a substantially dark state without substantially pulsing.

The non-transitory computer readable medium as described herein, further executing the steps comprising monitonically increasing a transmittance of the electro-optic device.

The non-transitory computer readable medium as described herein, further executing the steps comprising increasing a transmittance of the electro-optic device devoid of any periodic reduction in transmission being less than about 0.7% of the current transmission or less than about 0.5% of the current transmission.

The non-transitory computer readable medium as described herein, further executing the steps comprising increasing a transmittance of the electro-optic device, such that there is approximately no reductions in transmission during clearing. According to one embodiment, there are less about two periodic reductions (e.g., pulses) in transmission per minute.

The non-transitory computer readable medium as described herein, further executing the steps comprising using a magnitude of the open circuit voltage potential to determine a counter-potential that is applied in order to clear the electro-optic device.

The non-transitory computer readable medium as described herein, further executing the steps comprising monitoring a reverse current, and dynamically adjusting a potential to maintain a substantially maximized current magnitude and reduce current flow that otherwise results in reverse coloring.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A controller system configured to control an electro-optic device, said controller system comprising:
    an electro-optic device comprising:
        a first substantially transparent substrate;
        a second substantially transparent substrate approximately parallel to said first substantially transparent substrate such that a chamber is defined by said first and second substantially transparent substrates; and
        an electro-optic medium between said first and second substantially transparent substrates; and a controller in communication with said electro-optic device, wherein said controller is configured to:
monitor electrical power supplied to said electro-optic device;
determine at least one of an approximate minima and an approximate maxima based on the monitoring; and
adjust said electrical power supplied corresponding to at least one of the approximate minima and the approximate maxima, such that approximately a minimum potential is applied to said electro-optic device to maintain said electro-optic device in an approximately minimum transmission state.

2. The controller system of claim 1, wherein said controller is further configured to maintain said electro-optic device in said approximately minimum transmission state independent of a measurement of temperature of said electro-optic device.

3. The controller system of claim 1, wherein said controller is further configured to calculate a first derivative and a second derivative of electrical current across said electro-optic device and determine the approximate maxima and minima of said first and second derivatives, such that said potential to be supplied to maintain said approximately minimum transmission state can be determined based upon said maxima and minima.

4. The controller system of claim 1, wherein said controller is further configured for reverse potential monitoring and reverse potential control of said electrical power supplied to said electro-optic device.

5. The controller system of claim 4, wherein said reverse potential monitoring and reverse potential control comprises said electro-optic device operating as an open circuit, such that an open circuit voltage potential that a non-equilibrium state of said electro-optic device produces is monitored.

6. The controller system of claim 5, wherein said controller is configured to use a magnitude of said open circuit voltage potential to determine a counter-potential that is applied in order to clear the electro-optic device.

7. The controller system of claim 1, wherein said controller is further configured for current monitoring and reverse potential control.

8. The controller system of claim 7, wherein said current monitoring and reverse potential control comprise applying a reverse potential to said electro-optic device while reducing a current flowing in a reverse direction.

9. The controller system of claim 1, wherein said controller is further configured to monitor reverse current and dynamically adjust a potential to maintain a substantially maximized current magnitude and reduce current flow that otherwise results in reverse coloring.

10. The controller system of claim 1, wherein said controller is further configured to control transitions of said electro-optic device from a substantially clear state to a substantially dark state without substantially pulsing.

11. The controller system of claim 1, wherein said controller is further configured to control said electro-optic device, such that a transmittance of said electro-optic device monitonically increases.

12. The controller system of claim 1, wherein said controller is further configured to increase a transmittance of said electro-optic device devoid of any periodic reduction in transmission being less than about 0.5% of the current transmission.

13. A method for maintaining an electro-optic device at a substantially dark state, said method comprising the steps of:
supplying electrical power to said electro-optic device;
determining an approximate maxima and minima of an electrical current across said electro-optic device; and
adjusting said supplied electrical power to maintain said electro-optic device in an approximately minimum transmission state based on the approximate maxima and minima of the electrical current independent of a measurement of temperature of said electro-optic devices.

14. The method of claim 13 further comprising the steps of:
calculating a first derivative of electrical current across said electro-optic device;
calculating a second derivative of electrical current across said electro-optic device; and
determining the approximate maxima and minima of said first and second derivatives.

15. A non-transitory computer readable medium having stored thereon software instructions that, when executed by a processor, cause the processor to generate control signals to control an electro-optic device, by executing the steps comprising:
supplying electrical power to said electro-optic device; and
adjusting said supplied electrical power to maintain said electro-optic device in an approximately minimum transmission state independent of a measurement of temperature of said electro-optic device and based on an approximate maxima and minima of a current corresponding to the electrical power.

16. The non-transitory computer readable medium of claim 15 further executing the steps comprising:
calculating a first derivative of electrical current across said electro-optic device;
calculating a second derivative of electrical current across said electro-optic device; and
determining the approximate maxima and minima of said first and second derivatives.

17. The non-transitory computer readable medium of claim 15 further executing the steps comprising:
monitonically increasing a transmittance of said electro-optic device.

18. The controller system of claim 1, wherein said controller is further configured to determine the approximate maxima and minima of an electrical current across said electro-optic device to determine said electrical power to be supplied to maintain said approximately minimum transmission state based upon said maxima and minima.

19. The controller system of claim 1, wherein said controller is further configured to determine at least one rate of change corresponding to the electrical power, and wherein the at least one of the minima and the maxima are determined from the rate of change.

20. The controller system of claim 19, wherein the at least one rate of change corresponds to a first derivative and a second derivative of electrical current across said electro-optic device.

* * * * *